Nov. 26, 1957 M. FOGIEL 2,814,120
AUTOMATIC MEASURING DEVICE
Filed March 30, 1955 2 Sheets-Sheet 1

INVENTOR.
Max Fogiel

Nov. 26, 1957 M. FOGIEL 2,814,120
AUTOMATIC MEASURING DEVICE
Filed March 30, 1955 2 Sheets-Sheet 2

INVENTOR.
Max Fogiel

United States Patent Office 2,814,120
Patented Nov. 26, 1957

2,814,120

AUTOMATIC MEASURING DEVICE

Max Fogiel, New York, N. Y.

Application March 30, 1955, Serial No. 498,031

10 Claims. (Cl. 33—147)

This invention relates to a device which will automatically determine the magnitude of a given outside or inside dimension of any required range with an accuracy of the order of ±.0001 inch.

In the course of automatic manufacture related to machining operations, it is often required that the parts in process be inspected for dimensional accuracy during and after production. If the parts are nonuniform it is not possible to employ standard gauges and therefore it is desirable to have an inspection device which will automatically position itself and indicate the magnitude of the designated dimension. Such a device is also in considerable demand in the process of sorting nonuniform items. While many devices have been designed for the purpose of providing accurate measurements, they are not satisfactory in several respects. Thus, the devices are limited in range when the required accuracy approaches the magnitude of ±.0001 inch. In addition the mechanical devices which are available are relatively complex and expensive. The purpose of the device described in this specification is to improve upon these conditions by providing a simple and inexpensive means to obtain the required measurements. The device has the specific advantage of not requiring an accurate screw thread. If it were possible to machine inexpensively a screw thread whose accuracy was comparable to the required accuracy of measurement, the device of Figure 1 would prove to be adequate. In view of the fact that this machining operation is not readily accomplished, the system of Figure 2 has been developed.

Figure 1:
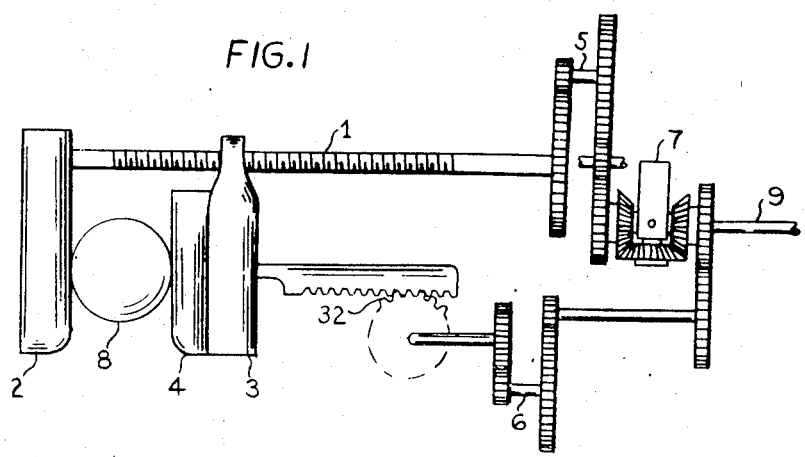
Figure 1 is a functional schematic diagram of a device which requires that the accuracy of the screw thread be of the same order as the accuracy with which the measurement is to be taken.
Figure 2:
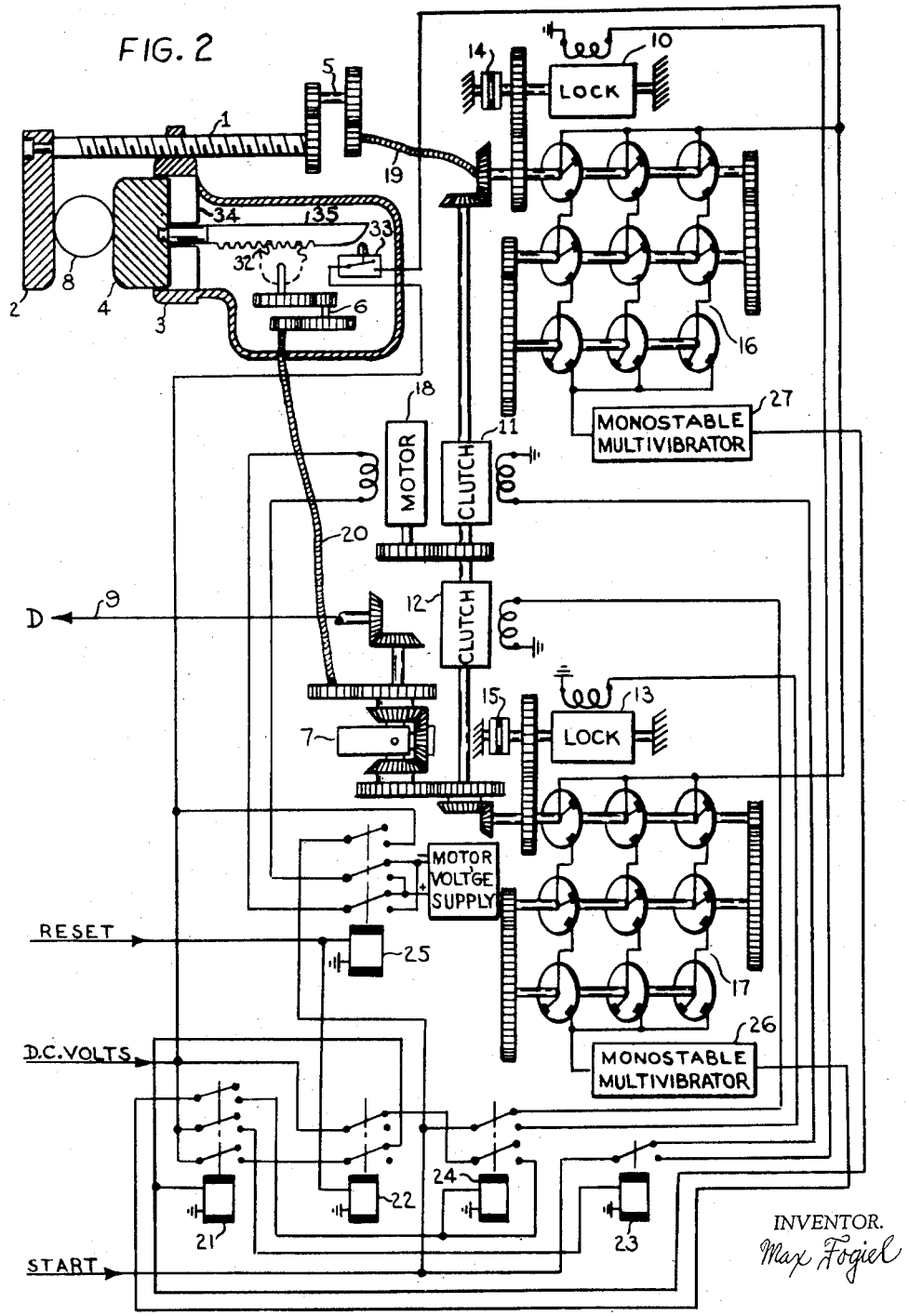
Figure 2 is a functional schematic diagram of the measuring device system described in this specification.

The device shown in Figure 1 consists essentially of a screw 1, "fixed jaw" 2, and movable jaw 3. Assuming as an example that the diameter of shaft 8 is to be measured, the fixed jaw 2 while not having any motion relative to the screw in its longitudinal direction, does not remain stationary in space assuming the shaft is suspended between fixed centers. Thus, as shown in Figure 1, the distance between the fixed jaw 2 and the axis of the shaft 8 which is fixed in space, varies with the radius of the shaft and therefore it is necessary that the design of the device permit free movement of the screw and frame in the direction along the screw axis. By transmitting the screw shaft position through a flexible shaft 19 as shown in Figure 2, this requirement becomes fulfilled.

The movable jaw 3 acts as a housing for a tongue 4 which may be pushed into the movable jaw to a distance of over one inch. The manner in which the tongue may mount within the movable jaw is illustrated in Figure 2. The movable jaw has a slot 34 which supports the tongue and permits the tongue to slide freely within it. The tongue is rigidly fastened to a gear rack 35 which serves the function of transmitting the motion of the tongue. The tongue serves to eliminate the "feel" which is required to be exercised by the machinist when measuring a diameter by means of a standard micrometer. When measuring the diameter of a shaft with a standard micrometer, the machinist must tighten the micrometer about the shaft with the correct amount of pressure in order to obtain an accurate indication of the diameter. Since the degree of pressure with which the machinist tightens the micrometer about the work to be measured depends upon the individual operator, it is possible that a number of different measurement readings may be obtained from the same diameter when the latter is measured by a number of different individuals. This is especially true when tolerances of ±.0001 inch are required. The "feel" represents the skill of the machinist required to correctly clamp the micrometer to the work being measured. It is therefore important that the pressure exerted by the tongue upon the shaft 8 remains constant throughout the tongue's range of depression.

The tongue 4 also serves to eliminate the necessity of calibrating the screw 1 over its total range. By calibrating the tongue over its one inch range it is necessary to calibrate the screw only at the 1", 2", 3", etc. marks. Thus, when measuring the diameter of the shaft 8, the movable jaw 3 will be located only at positions which are multiples of one inch, while the tongue may be depressed to any amount that is within its one inch range. The diameter of the shaft will then be given by the sum of the dimension represented by the position of the movable jaw and the decimal represented by the depression of the tongue. The truth of this statement may be shown as follows: To insure that jaw 2 and tongue 4 are in contact with the shaft when its measurement is being recorded, the construction of the measuring instrument is such that the rotation of the screw which advances the movable jaw towards the shaft to be measured, will not cease unless the tongue has been depressed at least by the amount Δ, and the movable jaw is in a position which is a multiple of one inch. Assuming the shaft 8 shown in Figure 1 is to be measured, the screw 1 will be rotated in a direction so that the movable jaw 3 will advance toward the shaft. At the instant when the surface of the tongue 4 makes contact with the shaft, the position of the movable jaw indicates the diameter of the shaft to be measured. The rotation of the screw, however, will continue, and unless the movable jaw is at a position which is an integral number of inches at the instant when the tongue is depressed by the amount Δ, the screw will rotate until the movable jaw is in such a position. Therefore, when the screw has stopped rotating, the position of the movable jaw will indicate the quantity $(D-\delta)$ where $\delta$ is the amount of tongue depression. It is apparent, therefore, that if the depression $\delta$ is added to the position of the movable jaw $(D-\delta)$ the shaft diameter $D=\delta+(D-\delta)$ is obtained. There are no limitations for the quantity Δ except for the fact that it acts to increase the range of the tongue. Thus, if $\epsilon$ is small compared to the quantity Δ, and if the shaft diameter D is equal to an integral number of inches plus the quantity $\Delta-\epsilon$, the rotation of the screw will not cease when the movable jaw is at a position which indicates an integral number of inches and the tongue is depressed by the amount $\Delta-\epsilon$. The rotation of the screw will, instead, continue to advance the movable jaw until the latter is in the position which indicates an integral number of inches equal to $D-(1+\Delta-\epsilon)$. The depression of the tongue, therefore, is equal to $(1+\Delta-\epsilon)$, and the range of the tongue must be increased to the amount of $(1+\Delta)$ inches. The quantity $\epsilon$ has been introduced here to represent an amount of tongue deflection which is very small compared to $\Delta$. $\epsilon$ is employed as a mathematical tool to facilitate the analysis for the derivation of the length of the tongue. Thus, the expression $(\Delta-\epsilon)$ signifies the condition that the tongue deflection is somewhat less than $\Delta$ and therefore screw rotation will not cease at this amount of tongue deflection even though the movable jaw is at a position which represents an integral number of inches, since stoppage of the screw rotation requires that the tongue be deflected the full amount $\Delta$.

It should be noted that the position of the movable jaw 3 is proportionally represented by the position of the screw shaft 1. The rotation of the screw shaft is transmitted through a gear train 5 to one of the inputs of a mechanical differential 7. The other input to the differential is a shaft which rotates in the amount that is proportional to the tongue depression. The gearing 5 and 6 of the system is arranged so that the output 9 of the differential will represent the sum of its two inputs. The mechanical differential as shown is a standard component which is stocked by any supplier of instrument hardware. In principle it is equivalent to the differential used for transmission at the rear of automobiles.

The foregoing analysis for the range of the tongue 4 as $(1+\Delta)$ inches was simplified because it was based on the assumption that the cut thread on the screw shaft 1 and the mechanism which transmits the rotation of the screw shaft to the differential 7 are perfect. The analysis for the true range of the tongue is further complicated by the fact that the rotation of the screw shaft cannot be stopped instantly. Assume that time $\tau$ is required between the instant that the coil of solenoid lock 10 is energized and the instant that the rotation of the screw is completely stopped. During the time $\tau$ the rotation of the screw advances the movable jaw 3 a definite distance of magnitude $e$. Assume that the tongue is depressed $\Delta-\epsilon$ when the movable jaw is located time $\tau$ ahead of the position which represents an integral number of inches. As previously explained, the depression of the tongue at this point is inadequate to energize the coil of the solenoid lock and therefore the screw will continue to rotate until the movable jaw has advanced the additional distance $(1+e)$ inches. During the time that the movable jaw advances through the distance $(1+e)$ inches, the tongue is additionally depressed by the same amount, and therefore the total depression of the tongue is $$[(\Delta-\epsilon)+(1+e)]$$

inches. If the tongue depression is $\Delta+\epsilon$ when the movable jaw is located $e$ inches ahead of an integral number of inches, the coil of the solenoid lock is energized, and the rotation of the screw will be stopped when the movable jaw has advanced $e$ inches from the instant that the coil was energized. The total depression of the tongue for this condition is $(\Delta+\epsilon+e)$. Since the quantity $$[(\Delta-\epsilon)+(1+e)]$$

is greater than the quantity $(\Delta+\epsilon+e)$, the minimum range of the tongue is determined by the factor $(1+\Delta+e)$. It should be observed at this point that the time interval $\tau$ between the instant that the coil of the solenoid lock is energized and the instant that the screw rotation is actually stopped is essentially a constant throughout the range of the screw, provided the speed of screw rotation is constant at the instant the coil is energized. Due to the irregularities of the screw thread, however, it is possible that during time $\tau$ the movable jaw will not advance a constant distance $e$ throughout the range of the screw. In determining the range of the tongue, therefore, it is necessary to use the maximum value of $e$ thus encountered.

The backlash which exists between the thread of the screw shaft 1 and that of the movable jaw 3 is discussed in a later paragraph where it is shown to have no effect on the accuracy of the diameter measurement. Regardless of this backlash consideration, however, the imperfections existing in the screw thread and in the transmitting mechanism between screw shaft and differential 7 make it possible that for zero depression of the tongue 4, the number of revolutions at the output shaft of the differential when the movable jaw is located at the 2″ mark are not exactly twice the number of revolutions present when the movable jaw is situated at the 1″ mark. Because of this fact the screw is not mechanically connected directly to one of the input shafts of the differential. The following design which is introduced makes it possible for the output shaft of the differential to represent the exact same number of integral inches as the space between the undepressed tongue and the fixed jaw 2.

As shown in Figure 2, the screw shaft 1 is driven by a motor 18 through a clutch 11, and it is directly connected to a solenoid lock 10 and a set of cams 16 which operate as signal transmitters. The cam is a unit arranged so that a pulse signal is transmitted whenever the cam is oriented at a given angular position. Whenever the movable jaw 3 is at a position which represents an integral number of inches plus $e$, the corresponding cams cause electrical pulses to be transmitted, and providing the tongue 4 is sufficiently depressed, the clutch is released and the solenoid lock is energized. The motor also drives one of the input shafts of the differential 7 through a clutch 12. Connected directly to the input shaft of the differential is a solenoid lock 13 and a set of cams 17 which operate in a manner similar to that explained for the screw shaft. The operation of the system is as follows:

When a shaft 8 of diameter D is to be measured, the screw shaft 1 will rotate until the depression of the tongue 4 is greater than $\Delta$ and the space between the contact surfaces of the tongue and fixed jaw 2 is equal to an integral number of inches plus $e$. When that condition occurs, the clutch 11 and lock 10 are respectively de-energized and energized. After the elapse of a small interval of time $t$ to be determined later, the pulse transmitting cams 17 form a circuit which de-energizes and energizes the corresponding clutch 12 and lock 13 respectively. When the rotation of the input shaft to the differential has ceased, its shaft position will represent the same number of integral inches as that represented by the screw shaft.

It will now be shown that either one of the two intervals of time $\tau$ or $\tau'$ must always be greater than the other. $\tau'$ is the time interval between the instant that clutch 12 is de-energized and the instant that the input shaft to the differential 7 is actually stopped by lock 13. The quantity $e'$ represents the amount that the input shaft to the differential rotates during the time $\tau'$.

Assume that in measuring a shaft of diameter D, the tongue is depressed $(\Delta-\epsilon)$ inches when the movable jaw is located $e$ inches before an integral number of inches. With this existing condition, the screw shaft will continue to rotate, but if at some instant later the tongue deflection is $(\Delta+\epsilon)$ when the input shaft to the differential is located at a position which indicates an integral number of inches plus $e'$, the clutch 12 and lock 13 will be de-energized and energized respectively. The screw shaft, on the other hand, continues to rotate until the movable jaw is in the position which indicates the next consecutive integral number of inches. Remembering that the time interval $\tau$ and $\tau'$ differ from each other only to the extent of the irregularities present in the screw thread, it is seen that the shaft dimension indicated by the differential output 9 is one inch greater than the actual shaft diameter. To prevent such an occurrence, the electrical circuit shown in Figure 2 is introduced. In applying this circuit, it may be observed that it is not necessary for $\tau$ to be always greater than $\tau'$. This undesirable feature in the measuring device would be just as effectively eliminated if $\tau'$ were always greater than $\tau$. It doesn't matter which one is greater, as long as one is always consistently greater than the other.

The circuit of Figure 2 may be explained as follows:

In measuring the diameter of a shaft 8, the screw shaft 1 rotates until the movable jaw 3 is at a location which represents an integral number of inches plus $e$. Providing the tongue 4 is adequately depressed as indicated by the operation of switch 33, relay 21 is energized. This results in the de-energizing of clutch 11. Relay 21 remains energized even though the signal which first energized this relay ceases. With relay 21 in the energized position, relay 24 may be energized providing the input shaft of the differential is at the position which represents the same number of integral inches as the screw shaft plus $e'$. When the latter condition occurs, clutch 12 and lock 13 are energized and de-energized respectively.

It may be seen from this discussion, therefore, that the difference $t=\tau-\tau'$ must at least equal the time constant for relay 21. This required difference is small for the time constant of such a relay is of the order of .025 second. Since the interval of time between the instant that clutch 11 is de-energized and the instant that clutch 12 is also de-energized depends largely upon the irregularities present in the screw thread, the time delay incorporated into relay 23 should approximately represent the magnitude of these irregularities.

Similar to relay 21, relay 24 also remains energized even though the signal which initially energized this relay ceases. This feature in the circuit is important, for the signals which energize relays 21 and 24 are transmitted only at the instant when the movable jaw and differential input shaft are at positions which represent the distance $e$ and $e'$ ahead of an integral number of inches. These signals are transmitted long enough to energize the relays but they cease to exist when the screw shaft and differential input shaft arrive at their stationary positions. The reason for this effect is explained in a later paragraph.

In retracting the movable jaw from the shaft, it is possible that due to manufacturing variations in the components used, clutches 11 and 12 are not energized at exactly the same instant of time. This, however, proves to be of no consequence as shown by the following analysis. Assume, for an example, that clutch 11 is energized before clutch 12. At the instant that the differential input shaft is rotated through clutch 12, therefore, the screw shaft 1 will have already been rotated by the amount $\theta'$ through clutch 11. When the movable jaw 3 has been retracted the proper distance and the clutches are de-energized, it is possible that the release sequence of the clutches is of the nature where the difference in the angular positions of the shafts in question is $\theta'+\beta$ when the shafts have arrived at their stationary positions. The quantity $\beta$ may assume either a positive or negative sign. It is possible to eliminate $\beta$, however, by adjusting the friction clutches 14 and 15 in a relative manner so that $\beta$ will be fully compensated for. Consequently, since the time that the circuit was actuated to retract the movable jaw, the screw shaft will have rotated through the angle $\theta+\theta'$ while the differential input shaft will have rotated through the angle $\theta$. When the clutches are re-energized for the purpose of advancing the movable jaw towards the shaft, the screw shaft will again have been rotated through the angle $\theta'$ (but in the opposite direction) at the instant that the differential input shaft is begun to be rotated through clutch 12. Therefore, at the instant that the differential input shaft begins to rotate, the position of the screw shaft is given by $(\theta+\theta')-\theta'=\theta$. Since the position of the screw shaft thus agrees with that of the differential input shaft, the two shafts are in the proper relationship with one another when the movable jaw is being advanced towards the shaft. While this proper relationship may not exist during the time that the movable jaw is retracted from the shaft, no consequence is suffered as a result of this since no measurements are being recorded at this time. It goes without saying that this analysis would arrive at the same conclusions if clutch 12 were assumed to be energized before 11. The movable jaw may be retracted from the shaft by applying a reset signal to energize relay 25. The operation of relay 25 energizes clutches 11 and 12 and reverses the direction of the motor to separate the movable jaw from the fixed jaw and retract the movable jaw from the shaft.

Figure 3:
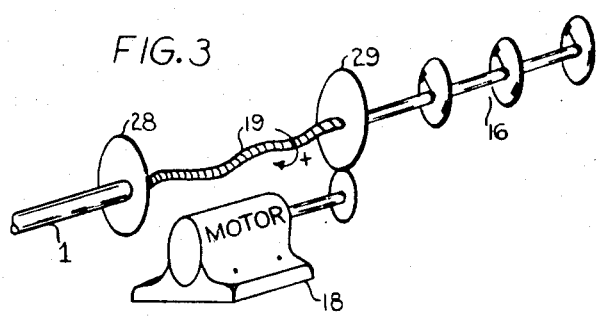
Figure 3 is a functional schematic diagram of the part of the system which transmits the position of the movable jaw 3.

The diagram of Figure 2 shows that the screw shaft 1 is driven through a flexible shaft 19 and that the motion of the tongue is also transmitted through a flexible shaft 20 to the input shaft of the differential 7. The manner in which these flexible shafts affect the accuracy and operation of the measuring device may be shown as follows:

In Figure 3 let the position of disk 28 represent the position of the screw 1 when the diameter of a shaft 8 is being measured and the movable jaw 3 is at a position which indicates an integral number of inches. Disc 29 represents the position of the shaft upon which are mounted the pulse transmitting cams 16. Adjust the position of disk 29 so that it will represent the number of integral inches indicated by disk 28. Assume for the purpose of generality that disk 29 is rotated by the motor 18 through an angle of $+\alpha$ when the movable jaw is retracted from the work to be measured. Because of the presence of torsional deflection in the flexible shaft 19, however, disk 28 will rotate through the angle $+\alpha-a$ where $a$ is the lost motion due to the torsional deflection. The torsional deflection arises as a result of the fact that when a shaft under load is turned, there is a certain amount of lost motion due to the tightening up of the wires in the shaft. This lost motion, or torsional deflection as it is properly called, increases with the length of the shaft and with the load.

After the movable jaw 3 has been retracted from shaft 8, disk 29 will not correctly indicate the position of disk 28 due to the error $a$ caused by the lost motion in the flexible shaft 19. This error, however, does not affect the accuracy of the device because the diameter of a shaft is not being measured at this point. When the diameter of the shaft is again being measured, assume that disk 29 has been rotated through the angle $-\alpha_1$ when the screw shaft 1 has arrived at its stationary position. The position of disk 29 is therefore $(+\alpha-\alpha_1)$. Because of the lost motion again present in the flexible shaft, the corresponding rotation of 28 is $-(\alpha_1-a)$, and the actual position of disk 28 is $(+\alpha-a)-(\alpha_1-a)=+\alpha-\alpha_1$. Comparison of the shaft positions of disks 28 and 29 indicates that there is no difference between them and therefore disk 29 will always represent the position indicated by disk 28 when the diameter of a shaft is being measured.

Figure 4:
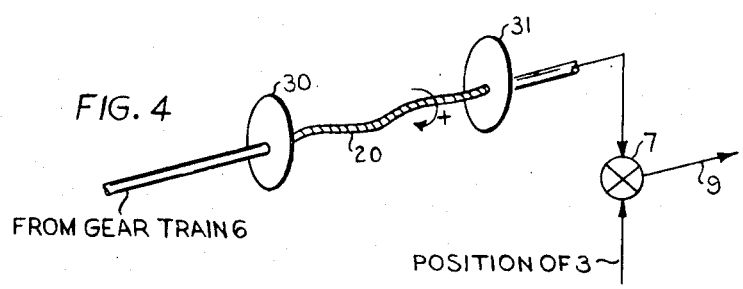
Figure 4 is a functional schematic diagram of the part of the system which transmits the depression of the tongue 4.

A similar analysis may be carried through for the flexible shaft that transmits the deflection of the tongue. In Figure 4 let the position of disk 30 represent the depression of the tongue 4, and let disk 31 represent the position of the input shaft to the differential 7. Adjust disk 31 so that the differential input shaft will represent the depression of the tongue. Assume that disk 30 has experienced a rotation $+\alpha_2$ when the tongue has been released and its depression is zero. Because of the lost motion present in the flexible shaft 20, the corresponding angular rotation of 31 is $+(\alpha_2-a')$, where $a'$ is equal to the lost motion. While the positions of disks 30 and 31 do not correspond at this point, no error is actually introduced because shaft 8 is not being measured and no attention is given to the output shaft 9 of the differential.

Assume that disk 30 rotates through the angle $-\alpha_3$ when the tongue 4 is again depressed in the course of measuring a shaft diameter. The corresponding rotation of disk 31 will be $-(\alpha_3-a_1)$. The position of disk 31 at this point will therefore equal $+(\alpha_2-a_1)-(\alpha_3-a_1)=(+\alpha_2-\alpha_3)$, and this expression is equal to the position of disk 30.

The lost motion in the flexible shaft 20, therefore, does not introduce any error in the mechanism when it is measuring a shaft diameter.

The uncertainty of the instant at which the cams transmit their corresponding pulses and actually begin to exercise control over the location of the movable jaw 3 must be within the tolerance specified for the shaft diameter. This arises due to the fact that the position of the movable jaw must be located within that specified tolerance. Errors which arise due to the possibility that relay 21 will not repetitively operate at the same instant after the coil has been energized may be reflected in the uncertainty of the instant at which the cams 16 transmit their pulses. This uncertainty will essentially determine the shaft value in inches/revolution of the high speed cam shaft. The maximum permissible speed of this high speed cam shaft determines the maximum time required for the movable jaw 3 to traverse through the distance of one inch. It should be noted that while the maximum distance through which it may be required to advance the movable jaw is of the order of one inch, the average measuring operation will require that the movable jaw be advanced through a distance which is only half of this amount.

The angular velocity assumed by the high speed cam shaft may be of a magnitude so that the duration of the pulse transmitted by the cam will be of the order of a millisecond or even microsecond. Since a pulse of .025 second may be necessary for the operation of relays 21 and 24, a monostable multivibrator 26 and 27 is inserted in front of the relay so that the pulse of short duration will be stretched sufficiently to operate the relays properly. The circuit for the multivibrator is described in the usual standard texts of electronics.

The linear motion of the tongue depression is changed to that of the rotating type of motion by means of a gear rack 35 and pinion 32. Since a tongue depression of $\pi D_p$ inches, where $D_p$ is the pinion diameter, will rotate the pinion one revolution, the shaft value of the pinion is $\pi D_p$ inches/revolution. In order that the two inputs to the differential 7 are properly added, it is necessary that both inputs have the same angular direction and the same shaft values. Let this shaft value be represented by $K_d$ inches/revolution. To obtain the required shaft value, $$\pi D_p = K_d K_p$$

where $K_p$ is the ratio of the gear train between the pinion shaft and the differential input shaft.

If $K_d$ and $K_p$ are constants which are not factors of $\pi$, then $D_p$ must be of the dimension which has $1/\pi$ as a factor.

$$D_p = \frac{K_d K_p}{\pi}$$

Since $$D_p = N/P$$

and $$P = \pi/P_c$$

$$D_p = \frac{N P_c}{\pi}$$

where $N$ = number of teeth on the pinion
$P$ = diametral pitch
$P_c$ = circular pitch By assigning values to $N$ and $P_c$, $D_p$ and $K_p$ are determined. To properly transmit the tongue depression to the input shaft of the differential 7, it is necessary that the shaft supports of the gear train 6 and those of the rack and pinion 32 be rigidly connected to the housing of the movable jaw 3.

The magnitude of the backlash in the gears and its effect on the accuracy of the system may be accounted for as follows: The backlash between the screw thread of the movable jaw 3 and that of the screw shaft 1 may be reflected as additional lost motion in the flexible shaft 19. The backlash in the gear train adjacent to the screw shaft may be treated in a similar manner. The foregoing discussion on flexible shafts then indicates that this backlash does not contribute any error during the time that the shaft diameter is being measured. Similar results may be obtained for the backlash present in the gear train of the tongue 4 by reflecting it as additional lost motion in the flexible shaft 20. With regards to the backlash in the gears that mechanically connect the cam shafts, it may be imagined that the cam shafts are broken, and that flexible shafts are inserted to connect the broken ends of the shafts. The backlash encountered in the gears may then be reflected as lost motion in these virtual flexible shafts. The results which show that this backlash does not affect the accuracy of the measurements taken may then be obtained in the same manner as before.

It should be observed that some error in measurement may be introduced as the mechanical components expand and contract with changes in atmospheric conditions. Stray vibrations present near the location of the instrument will also contribute towards increasing the size of the error. For this reason it is necessary to check the accuracy of the measuring device at frequent intervals. In checking the device, however, it is not necessary to check the entire range if the immediate future requirements call for only a range of about one or two inches. In that case it is necessary to check and adjust only those locations in which the measurements are expected to fall.

From the foregoing discussion it is evident that it is possible to construct measuring devices which are applicable to any desirable range. Depending upon the specific requirements to be met, however, it may be more feasible to construct a device applicable to a range of only two or three inches. It is also conceivable that it may be necessary to have a device which will only measure the shaft diameter which is for example, within the limits $4'' \leq D \leq 6''$. By reversing the contact surfaces of the fixed and movable jaws and employing the preceding principles, it is possible to adapt the device to the measurement of inside dimensions.

I claim:

1. An automatic measuring device comprising in combination a fixed jaw, a movable jaw, a tongue contained in said movable jaw, a screw threaded shaft to bring said fixed jaw and said tongue in contact with the workpiece to be measured, a motor to rotate said threaded shaft, a first clutch mechanically coupled to said threaded shaft and to said motor to transmit the rotary motion of said motor to said threaded shaft, a first signal transmitting means mechanically coupled to said threaded shaft to transmit signals whenever said threaded shaft is rotated to positions which represent multiples of unit distance, a locking means mechanically coupled to said threaded shaft and actuated by signal from said first signal transmitting means to lock said threaded shaft at positions corresponding to multiples of unit distance, a summing means, a second signal transmitting means mechanically coupled to said summing means to transmit signals whenever said summing means is located at positions which correspond to the positions of said threaded shaft, a second clutch mechanically coupled to said motor and said summing means and said second signal transmitting means to transmit the rotary motion of said motor to said summing means, a locking means mechanically coupled to said second signal transmitting means and actuated by signal from said second signal transmitting means to lock the input of said summing means at positions corresponding to those of said threaded shaft, said summing means being mechanically coupled to said tongue to algebraically add the deflection of said tongue to the position of said threaded shaft, and friction clutches mechanically coupled to said first and second clutches to compensate for the difference in the release sequence of said first and second clutches.

2. The automatic measuring device of claim 1 wherein a gear rack attached to said tongue is in mesh with a pinion to transmit the deflection of said tongue to said summing means.

3. The automatic measuring device of claim 2 wherein an electrical switch fastened to the structure of said movable jaw is operated by the translatory motion of said gear rack indicating that the tongue has moved to the extent which insures that said tongue is in contact with said workpiece.

4. The automatic measuring device of claim 2 wherein a flexible shaft mechanically couples said summing means to the pinion in mesh with said gear rack attached to said tongue to allow said movable jaw free movement with respect to said summing means.

5. The automatic measuring device of claim 1 wherein said summing means consists of a mechanical differential to sum the deflection of said tongue and the position represented by the rotation of said threaded shaft.

6. The automatic measuring device of claim 1 wherein said first and second signal transmitting means consists of cams containing electrical contacts which close an electrical circuit whenever said cams are in a given angular position.

7. The automatic measuring device of claim 3 wherein said switch is electrically connected in series with said first and second signal transmitting means.

8. The automatic measuring device of claim 1 wherein the outputs of said signal transmitting means are connected to monostable multivibrators to increase the time interval of the signal suitable for relay operation.

9. The automatic measuring device of claim 1 wherein said locking means consists of a solenoid lock actuated by an electrical signal.

10. The automatic measuring device of claim 8 wherein the electrical control circuit for said clutches and locking means comprises in combination a first relay to receive the signal from said monostable multivibrator corresponding to said first signal transmitting means, a second relay to be energized by a signal from the first relay and release said first clutch and energize said locking means corresponding to said first signal transmitting means, a third relay to receive through said first relay the signal from said monostable multivibrator corresponding to said second signal transmitting means, a fourth relay which when operated returns the circuit to its initial condition, and a fifth relay simultaneously operated with said fourth relay to reverse said motor rotation.

References Cited in the file of this patent

UNITED STATES PATENTS

| | | |
|---|---|---|
| 2,294,831 | Carson | Sept. 1, 1942 |
| 2,503,851 | Snow | Apr. 11, 1950 |
| 2,633,642 | Levesque | Apr. 7, 1953 |
| 2,752,687 | Graham | July 3, 1956 |